(12) United States Patent
Wang et al.

(10) Patent No.: US 10,209,741 B2
(45) Date of Patent: Feb. 19, 2019

(54) FLEXIBLE DISPLAY SCREEN ELECTRONIC APPARATUS AND CONTROL SYSTEM THEREOF

(71) Applicant: BOE TECHNOLOGY GROUP CO., LTD., Beijing (CN)

(72) Inventors: Long Wang, Beijing (CN); Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 101 days.

(21) Appl. No.: 14/436,543

(22) PCT Filed: Aug. 7, 2014

(86) PCT No.: PCT/CN2014/083913
§ 371 (c)(1),
(2) Date: Apr. 17, 2015

(87) PCT Pub. No.: WO2015/143814
PCT Pub. Date: Oct. 1, 2015

(65) Prior Publication Data
US 2016/0266611 A1    Sep. 15, 2016

(30) Foreign Application Priority Data
Mar. 28, 2014   (CN) .......................... 2014 1 0124074

(51) Int. Cl.
*G06F 1/16* (2006.01)
*G06F 3/01* (2006.01)

(52) U.S. Cl.
CPC .............. *G06F 1/1652* (2013.01); *G06F 3/01* (2013.01)

(58) Field of Classification Search
CPC ........ G06F 1/1652; G06F 3/01; G06F 1/1601; G06F 2200/1612; G09F 9/301; H04M 1/0266
See application file for complete search history.

(56) References Cited

U.S. PATENT DOCUMENTS

2006/0034039 A1* 2/2006 Van Rens ............. G06F 1/1601
                                                361/679.29
2007/0177404 A1* 8/2007 Daniel .................. G06F 1/1601
                                                362/600

(Continued)

FOREIGN PATENT DOCUMENTS

CN          1701349 A      11/2005
CN        201185067 Y       1/2009

(Continued)

OTHER PUBLICATIONS

Feb. 12, 2014—International Search Report and Written Opinion with Eng Tran.

(Continued)

*Primary Examiner* — Robert J Michaud
(74) *Attorney, Agent, or Firm* — Banner & Witcoff, Ltd.

(57) ABSTRACT

A flexible display screen electronic apparatus and a control system thereof are provided. The flexible display screen electronic apparatus includes: an apparatus body, and a flexible display screen and a second roller which are disposed on the apparatus body. The flexible display screen includes a first end and a second end opposite to the first end, the first end is disposed on the apparatus body, the second end is fixed on a second roller, and the flexible display screen is configured to be windable around the second roller; and display surface area between the second end and the first end is variable. The flexible display screen electronic appa- (Continued)

ratus can change the size of the display screen flexibly as required to meet different demands of users.

15 Claims, 3 Drawing Sheets

(56) References Cited

U.S. PATENT DOCUMENTS

| | | | | |
|---|---|---|---|---|
| 2010/0246113 A1* | 9/2010 | Visser | ............... | G06F 1/1601 |
| | | | | 361/679.3 |
| 2013/0036638 A1 | 2/2013 | Kwack et al. | | |
| 2015/0220118 A1* | 8/2015 | Kwak | ............... | G06F 3/14 |
| | | | | 345/667 |

FOREIGN PATENT DOCUMENTS

| | | | |
|---|---|---|---|
| CN | 101504509 | A | 8/2009 |
| CN | 102123187 | A | 7/2011 |
| CN | 102239683 | A | 11/2011 |
| CN | 102279649 | A | 12/2011 |
| CN | 103399616 | A | 11/2013 |
| CN | 103941816 | A | 7/2014 |
| CN | 203759606 | U | 8/2014 |
| WO | 0247363 | A2 | 6/2002 |

OTHER PUBLICATIONS

Aug. 16, 2016—(CN)—First Office Action Appn 201410124074.6 with English Tran.
Dec. 27, 2016—(CN) Second Office Action Appn 201410124074.6 with English Tran.

\* cited by examiner

FLEXIBLE DISPLAY SCREEN ELECTRONIC APPARATUS AND CONTROL SYSTEM THEREOF

The application is a U.S National Phase entry of International Application No. PCT/CN2014/083913 filed on Aug. 7, 2014, designating the United states of America and claiming priority to Chinese Patent Application No. 201410124074.6 filed on Mar. 28, 2014. The present application claims priority to and the benefit of the above-identified applications and the above-identified applications are incorporated by reference herein in their entirety.

TECHNICAL FIELD

At least one embodiment of the present disclosure relates to a flexible display screen electronic apparatus and a control system thereof.

BACKGROUND

At present, there is a trend of fusion for phones and tablets, and the sizes of phones are getting larger and larger with main stream sizes already larger than 4 inches. The sizes of tablets are getting smaller and smaller, and products with a size of 7~8 inches become attractive to consumers. For example, mobile apparatuses with 5~7 inch touch screens have gained a name "phablet".

SUMMARY

At least one embodiment of the present disclosure provides a flexible display screen electronic apparatus and a control system thereof, and the flexible display screen electronic apparatus can change the size of a display screen flexibly as required, so as to meet different demands of users.

At least one embodiment of the present disclosure provides a flexible display screen electronic apparatus including: an apparatus body, and a flexible display screen and a second roller which are provided on the apparatus body. The flexible display screen includes a first end and a second end opposite to the first end, the first end is mounted on the apparatus body, the second end is fixed onto the second roller, and the flexible display screen is configured to be windable around the second roller; and display surface area between the second end and the first end is configured to be variable.

At least one embodiment of the present disclosure provides a control system including: a first obtaining unit configured to obtain display surface area of a display screen; a second obtaining unit configured to obtain image data; a processing unit configured to process the image data obtained by the second obtaining unit according to the display surface area of the display screen obtained by the first obtaining unit; and a display unit configured to display an image according to a processed result of the processing unit.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

Figure 1:
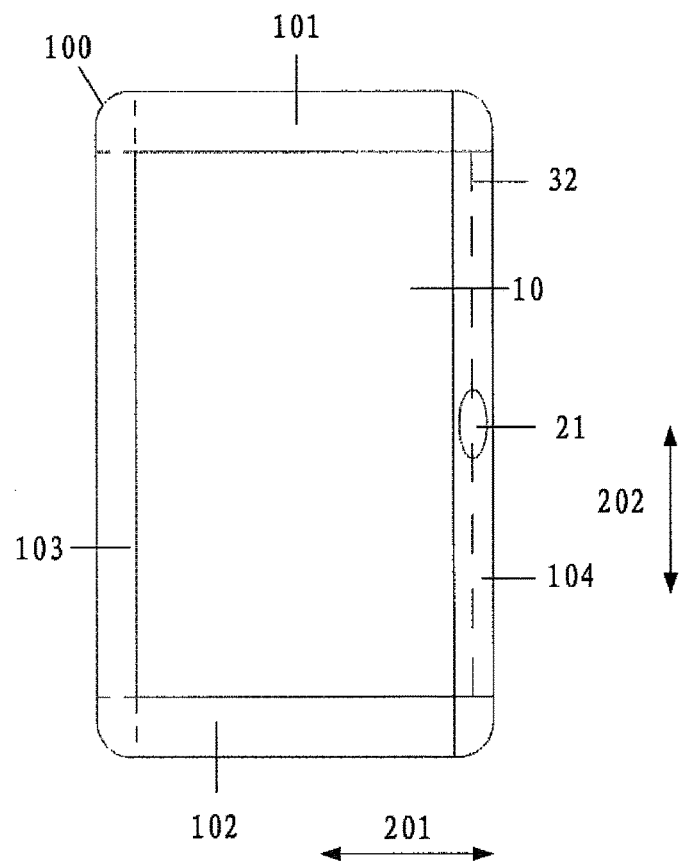
FIG. 1 is a schematic view of a flexible display screen electronic apparatus provided in an embodiment of the present disclosure.

10: flexible display screen; 20: fixed display screen; 100: apparatus body; 101: upper frame; 102: lower frame; 103: first side frame; 104: second side frame; 105: supporting section; 21: length-adjusting switch; 1011: first upper frame; 1012: second upper frame; 1013: third upper frame; 11: first display surface area; 12: second display surface area; 13: third display surface area; 31: first roller; 32: second roller; 321: second fastening section; 41: first switch; 42: second switch; 51: first displacement sensor; 52: second displacement sensor.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the teens such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

The inventor of the present application noted that a large phone brings inconveniences in terms of use and carrying; and even when the size of a phone reaches 5~6 inches, situations in which contents cannot be seen clearly due to too small screen can still frequently occur in the process of viewing web pages or reading materials with a phone. Therefore, how to enable phones to better meet consumer demands while being portable has become a topic concerned by designers.

At least one embodiment of the present disclosure provides a flexible display screen electronic apparatus including an apparatus body, and a flexible display screen and a second roller which are provided on the apparatus body. The flexible display screen includes a first end and a second end opposite to the first end, the first end is provided on the apparatus body, the second end is fixed onto the second roller, and the flexible display screen is configured to be windable around the second roller; and the display surface area between the second end and the first end is configured to be variable.

It is to be noted that the flexible display screen includes a first end and a second end opposite to the first end, the first end is provided on the apparatus body, the second end is fixed onto the second roller, and the flexible display screen is configured to be windable around the second roller; and the display surface area between the second end and the first end is configured to be variable, that is, it is possible to vary the area of the flexible display screen between the first end and the second end by changing the position of the second end opposite to the first end, and thus to change the display surface area of the electronic apparatus. In one example, the second end is coiled around the second roller such that the display surface area between the first end and the second end of the flexible display screen can be controlled through the second roller. In various examples, the first end can be mounted on the apparatus body and be fixed, or be mounted on the apparatus body and be movable.

In the flexible display screen electronic apparatus provided in at least one embodiment of the present disclosure, the first end of the flexible display screen is disposed on the apparatus body, the second end is fixed to the second roller and the flexible display screen is configured to be coiled around the second roller; and the display surface area, between the first end and the second end, of the flexible display screen is configured to be variable by changing the position of the second end opposite to the first end. Therefore, the electronic apparatus is applicable to different applications.

In one example, as illustrated in FIG. 1, the apparatus body 100 includes an upper frame 101, a lower frame 102 opposite to the upper frame 101, a first side frame 103 and a second side frame 104 opposite to the first side frame 103. The upper frame 101 and the lower frame 102 respectively act as a length-adjustable frame. As illustrated in FIG. 1, the flexible display screen 10, along the first direction 201, includes a first end and a second end, and the flexible display screen 10, along the second direction 202, further includes a third end and a fourth end. The first end of the flexible display screen 10 extends along the second direction 202 and is fixed to the first side frame 103, and the second end of the flexible display screen 10 extends along the second direction 202 and is fixed with the second roller 32, and the second roller 32 is mounted on the second side frame 104. The third end and the fourth end of the flexible display screen respectively correspond to the upper frame 101 and the lower frame 102. For example, along the first direction 201, the third end of the flexible display screen 10 can be fixed with the upper frame 101, and the fourth end of the flexible display screen 10 can be fixed with the lower frame 102.

Figure 3:
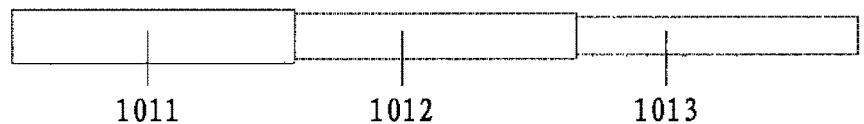
FIG. 3 is a side view of an upper frame of the electronic apparatus illustrated in FIG. 1.

In one example, the upper frame 101 and the lower frame 102 can respectively act as a length-adjustable frame with structure as illustrated in FIG. 3, and will be described taking the upper frame 101 as an example. After protrusion, the upper frame 101 can include a first upper frame 1011, a second upper frame 1012 and a third upper frame 1013. The first upper frame 1011 has a cross section greater than that of the second upper frame 1012, and the second upper frame 1012 has a cross section greater than that of the third upper frame 1013, such that upon compression, the second upper frame 1012 can be accommodated in the first upper frame 1011 and the third upper frame 1013 can be accommodated in the second upper frame 1012, and this can implement the length-adjusting design of the second upper frame and third upper frame. Of course, the lower frame is opposite to the upper frame, then the arrangement of the lower frame corresponds to that of the upper frame, and only the upper frame is described herein as an example. The upper frame and the lower frame respectively act as a length-adjustable frame with a plurality of length-adjusting manners and the number of length-adjustable frames can be determined as required. Embodiments of the present disclosure are described in detail only by taking the length-adjusting manner illustrated in figures and the upper frame and lower frame including three length-adjustable frames respectively as an example. However, embodiments of the present disclosure are not limited thereto.

It is to be noted that when the upper frame 101 and the lower frame 102 respectively act as a length-adjustable frame, at least one of the first side frame 103 and the second side frame 104 of the apparatus body 100 is movable along with the upper frame 101 and the lower frame 102. In addition, the upper frame 101 and the lower frame 102 can also respectively be a length-unadjustable frame, in which case the flexible display screen can be supported by providing a supporting section described below.

Figure 2:
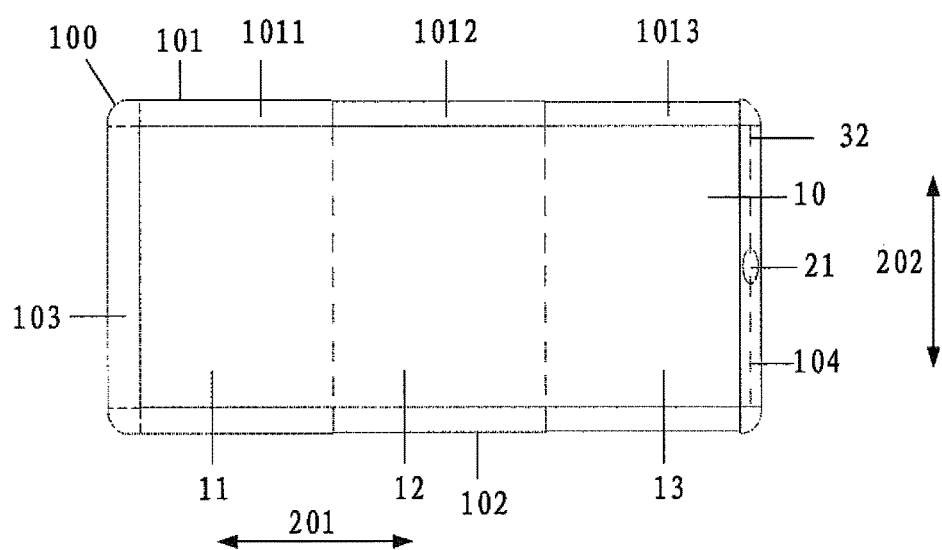
FIG. 2 is a schematic view of a display status of the electronic apparatus illustrated in FIG. 1.

For example, the electronic apparatus with fully spread out upper frame and lower frame is illustrated in FIG. 2, in which the first upper frame 1011 corresponds to a first display region 11, the second upper frame 1012 corresponds to a second display region 12, and the third upper frame 1013 corresponds to a third display region 13. The display surface area between the first end and the second end of the flexible display screen 10, along the first direction 201, is increased from one display region illustrated in FIG. 1 to three display regions illustrated in FIG. 2, namely the display surface area is increased, so as to be suitable for different applications.

It is to be noted that when the upper frame and the lower frame draw back, as illustrated in FIG. 1, the flexible display screen 10 can be coiled around the second roller 32. When the upper frame and the lower frame stretch out, as illustrated in FIG. 2, the flexible display screen 10 coiled around the second roller 32 spreads, and this increases the display surface area.

In one example, as illustrated in FIGS. 1 and 2, the apparatus body 100 can be further provided with a length-adjusting switch 21 configured for controlling a length-adjusting state of the upper frame 101 and the lower frame 102. That is, automatic control for the display surface area of the flexible display screen is realized by the length-adjusting switch 21, and this is convenient to use.

In addition, because the flexible display screen is coiled around the second roller, it is further possible to provide a displacement sensor on the second roller to detect the display surface area of the flexible display screen.

Figure 4:
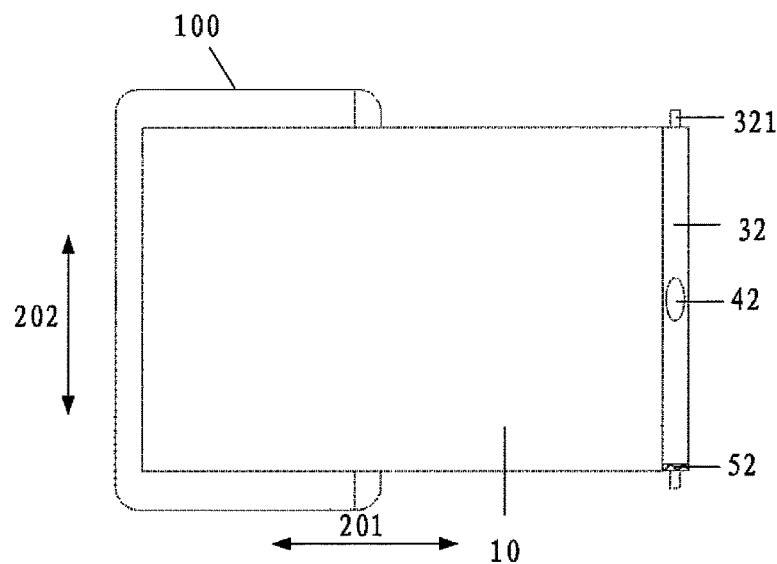
FIG. 4 is a schematic view of another flexible display screen electronic apparatus provided in an embodiment of the present disclosure.

In various examples, as illustrated in FIG. 4, the second roller 32 can be mounted on the apparatus body 100 and be movable or immovable.

The flexible display screen 10 can be coiled around the second roller 32, that is, the second end of the flexible display screen is fixed to the second roller 32 and the second roller can be rotatable to wind the flexible display screen thereon. In one example, the second roller 32 is movably mounted on the apparatus body, as illustrated in FIG. 4, when the second roller 32 moves away from the apparatus body 100 and unwinds the flexible display screen 10 wound around the second roller 32, the display surface area between the first end and the second end of the flexible display screen 10 along the first direction increases. Of course, it is possible to set the specific positions of the second roller 32 according to practical demands, so as to provide different display surface areas.

In one example, the second roller 32 is immovably mounted on the apparatus body 100. For example, when the second roller 32 is mounted on the second side frame 104 of the apparatus body 100 and the second side frame 104 is immovable, it is possible to set the first side frame 103 of the apparatus body 100 to be movable, and implement the variation of the display surface area of the flexible display screen 10 by controlling the movement of the first side frame 103 and the winding of the flexible display screen 10 around the second roller 32.

In addition, the second side frame 104, to which the second roller 32 is fixed, of the apparatus body can be configured to comprise a cambered surface of arc shape to guarantee flat and smooth display of the display screen after the flexible display screen spreads.

In one example, as illustrated in FIG. 4, the second roller 32 is mounted on the apparatus body 100 through at least one second fastening section 321 which each is configured to be able to stretch out/draw back. The electronic apparatus further includes a second switch 42 configured for controlling a stretching out/drawing back state of the second fastening section 321. The second fastening section 321 which is configured to be able to stretch out/draw back protrudes to fix the second roller 32 on the apparatus body 100, and retracts so that the second roller 32 is movable with respect to the apparatus body 100. In addition, because the second end of the flexible display screen 10 is fixed on the second roller 32, moving the second roller 32 can change the display surface area of the flexible display screen 10. The second switch 42 mainly functions to control the stretching out/drawing back state of the second fastening section 321 for convenient operation and use.

It is to be noted that the electronic apparatus illustrated in FIG. 4 can be configured in a way that only the second end of flexible display screen 10 is fixed on the second roller 32 and the flexible display screen 10 is wound around the second roller 32 to change the display surface area of the display screen 10. The first end of the flexible display screen 10 can be fixedly or movably mounted on the apparatus body 100.

In one example, as illustrated in FIG. 4, each of the two opposite ends (namely two ends in the second direction 202) of the second roller 32 can be provided with a second fastening section 321 which is configured to be able to stretch out/draw back and the stretching out/drawing back state of the two second fastening sections 321 which each are configured to be able to stretch out/draw back can be controlled through a same second switch 42. That is, the second fastening sections 321 at two opposite ends of the second roller 32 are simultaneously controlled in terms of their stretching out/drawing back states by the same second switch 42.

Figure 5:
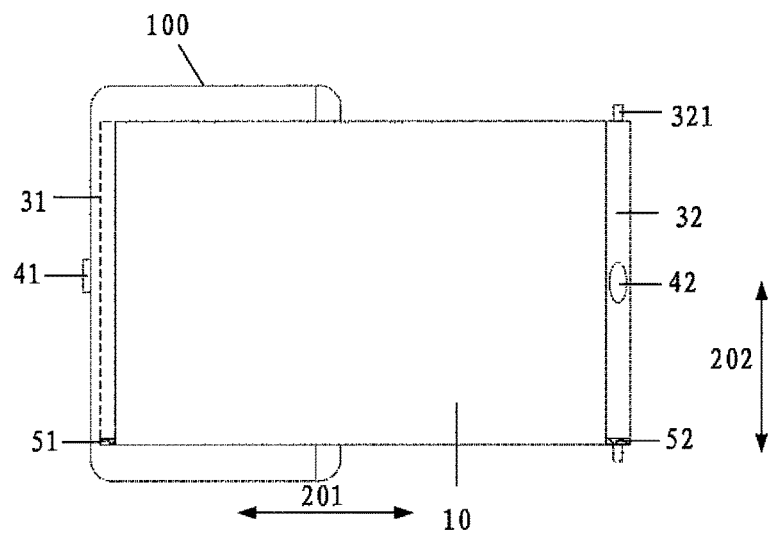
FIG. 5 is a schematic view of another flexible display screen electronic apparatus provided in an embodiment of the present disclosure.

It is to be noted that movably mounting the first end of the flexible display screen 10 on the apparatus body 100 can be implemented by configuring the above-mentioned first side frame 103 of the apparatus body 100 to be movable or by adopting a roller, and limitations are not imposed thereto. For example, as illustrated in FIG. 5, the apparatus body 100 can further include a first roller 31 disposed opposite to the second roller 32, the first end of the flexible display screen 10 is fixed on the first roller 31 and the first roller 31 can wind the flexible display screen 10 around the first roller 31 by rotation. In various examples, the first roller 31 can be fixedly mounted on the apparatus body 100 or movably mounted on the apparatus body 100. That is, two ends of the flexible display screen 10 can be fixed onto the first roller 31 and the second roller 32 respectively, the first end of the flexible display screen 10 is fixed to the first roller 31 and can be wound around the first roller 31, and the second end of the flexible display screen 10 is fixed to the second roller 32 and can be wound around the second roller 32, then the flexible display screen 10 can be wound around the two rollers respectively at its two opposite ends to reduce the winding thicknesses of rollers, and this can further realize a thin and light electronic apparatus.

In one example, as illustrated in FIG. 5, the first roller 31 can be further provided with a first switch 41 configured for controlling the rotation of the first roller 31. In one example, the first roller 31 can be provided with a spring leaf or the like, and the first switch 41 controls the rolling state of the first roller through the spring leaf to implement the spreading and winding of the flexible display screen 10.

In one example, at least one of the first roller and the second roller is provided with a displacement sensor. As illustrated in FIG. 4, the first end of the flexible display screen 10 is fixed on the apparatus body and the second end is wound around the second roller 32 such that the spreading area of the flexible display screen can be obtained by providing a second displacement sensor 52 on the second roller 32. As illustrated in FIG. 5, when the first end of the flexible display screen 10 is fixed on the first roller 31 and the screen is wound around the first roller 31, it is possible to obtain the spreading area of the flexible display screen on the first roller by providing a first displacement sensor 51 on the first roller 31. Meanwhile, if the flexible display screen 10 is also wound on the second roller 32, it is also possible to obtain the spreading area of the flexible display screen on the second roller through the second displacement sensor 52 on the second roller 32 to further determine the display surface area of the electronic apparatus.

Figure 6:
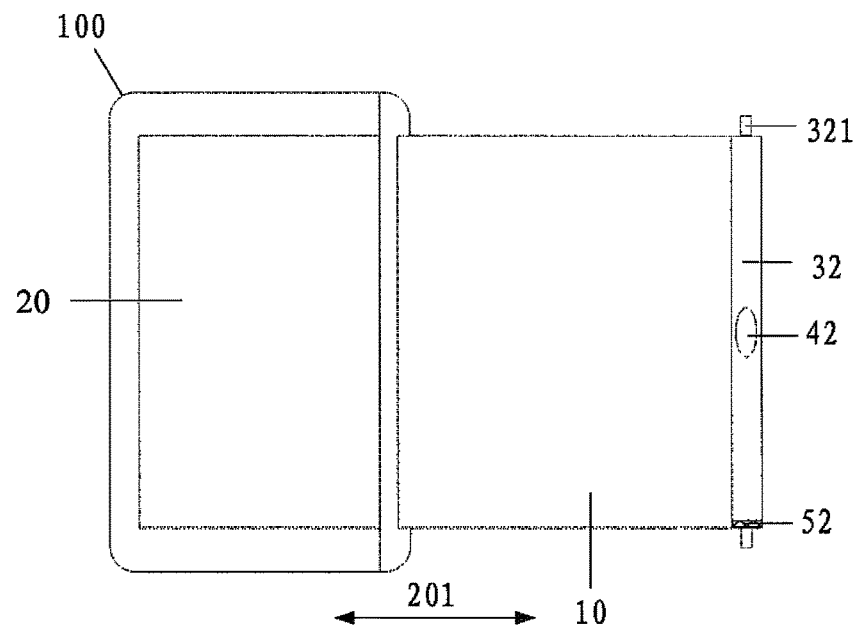
FIG. 6 is a schematic view of another flexible display screen electronic apparatus provided in an embodiment of the present disclosure.

In various examples, as illustrated in FIG. 6, the electronic apparatus can further include at least one fixed display screen 20 that each can display together with the flexible display screen 10 or separately. The fixed display screen 20 and the flexible display screen 10 can display a same picture at the same time, or display different pictures at the same time, or one of the fixed display screen 20 and the flexible display screen 10 displays pictures and the other is shut down. For example, it is possible that the fixed display 20 displays pictures and the flexible display screen 10 is retracted and fixed on the apparatus body 100.

It is to be noted that the flexible display screen illustrated in FIG. 6 can be disposed on the apparatus body 100 in the same way as illustrated in FIGS. 4 and 5. Detailed descriptions are omitted herein.

Figure 7:
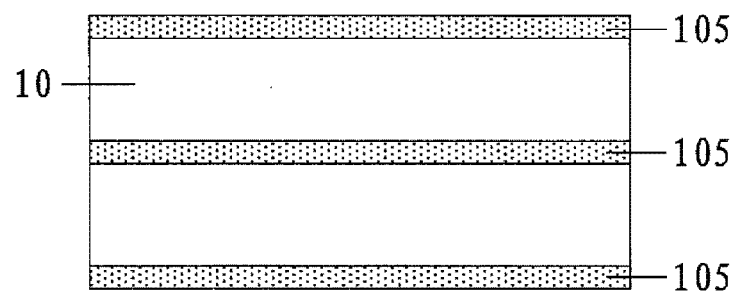
FIG. 7 is a schematic view of a back of a flexible display screen provided in an embodiment of the present disclosure.

In one example, as illustrated in FIG. 7, a supporting section 105 can be disposed on a back of the flexible display screen 10. FIG. 7 illustrates an example that three supporting sections 105 are disposed on the back of the flexible display screen 10. Of course, corresponding settings are possible according to demands. Because the flexible display screen is windable and therefore flexible, providing a supporting section to enhance stiffness of the flexible display screen can further guarantee the display effect of the flexible display screen.

In one example, the supporting section 105 can include a supporting strip formed of a metal or a polymer material, and this can guarantee both the windability of the flexible display screen and the display quality of the flexible display screen.

Figure 8:
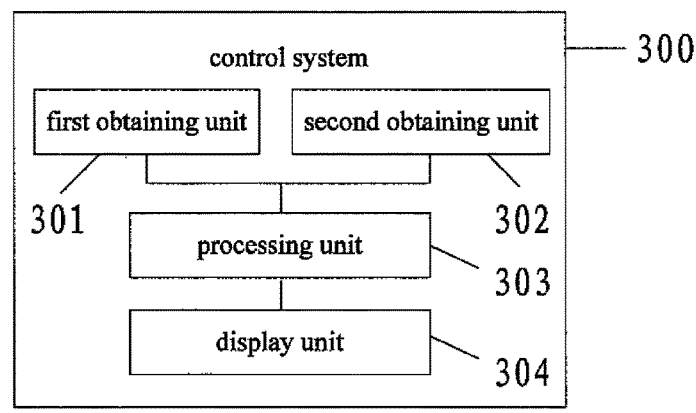
FIG. 8 is a schematic view of a display system provided in an embodiment of the present disclosure.

At least one embodiment of the present disclosure further provides a control system 300, as illustrated in FIG. 8, and the control system includes a first obtaining unit 301, a second obtaining unit 302, a processing unit 303 and a display unit 304.

The first obtaining unit 301 is configured to obtain display surface area of a display screen. In one example, for different examples provided in embodiments of the present disclosure, obtaining the display surface area of the display screen can be obtaining the display surface area of the flexible display screen only or obtaining the overall display surface area of the flexible display screen and the fixed display screen. The first obtaining unit 301 can obtain the display surface area of the flexible display screen through a displacement sensor.

The second obtaining unit 302 is configured to obtain image data. In one example, the image data obtained by the second obtaining unit 302 can be buffered graphic data obtained through a memory unit, for displaying the image data.

The processing unit 303 is configured to process the image data obtained by the second obtaining unit 302 according to the display surface area of the display screen obtained by the first obtaining unit 301. That is, the processing unit 303 processes the image data to display according to a specific display surface area of the electronic apparatus, for example, suitably settings the display proportion of the displayed image.

The display unit 304 is configured to display an image according to a processed result of the processing unit.

It is to be noted that the control system provided in the embodiment of the present disclosure realizes a better display effect mainly by adopting the processing unit 303 to suitably process the obtained display surface area of the display screen and the image data.

What are described above are only embodiments of the present disclosure. However, the scope of the present disclosure is not limited thereto. All the variations or substitutions that can easily conceived by a person skilled in the art within the technical scope disclosed by the present disclosure should belong to the scope of the present disclosure. Therefore, the scope of the present disclosure should be defined by the scope of the described claims.

The present application claims the benefit of China Patent Application No. 201410124074.6, filed on Mar. 28, 2014, which is hereby entirely incorporated by reference as part of the present application.

What is claimed is:

1. A flexible display screen electronic apparatus, comprising: an apparatus body, a flexible display screen, a first roller, a second roller, a first displacement sensor and a second displacement sensor,
   wherein the apparatus body comprises an upper frame, a lower frame opposite to the upper frame, a first side frame, and a second side frame opposite to the first side frame in a first direction;
   the flexible display screen comprises a first end and a second end opposite to the first end;
   the first roller is mounted on the first side frame, and the second roller is detachably mounted on the second side frame;
   the first end is fixed on the first roller, the second end is fixed on the second roller, and the flexible display screen is configured to be windable around the first roller and the second roller, and a display surface area between the second end and the first end is configured to be variable;
   the first displacement sensor is disposed on an end of the first roller, the second displacement sensor is disposed on an end of the second roller, and both the end of the first roller and the end of the second roller are closer to the lower frame compared with the upper frame; and
   the second side frame is provided at a side of the flexible display screen in a direction perpendicular to the flexible display screen electronic apparatus in a case that the second roller is detached from the second side frame.

2. The flexible display screen electronic apparatus of claim 1, wherein the apparatus body is further provided with a length-adjusting switch configured to control a length-adjusting state of the flexible display screen.

3. The flexible display screen electronic apparatus of claim 1, wherein the second roller is mounted on the apparatus body through at least one second fastening section which is configured to be able to stretch out/draw back, and the flexible display screen electronic apparatus further comprises a second switch configured to control a stretching out/drawing back state of the second fastening section; and
   the second switch is disposed on a side of the second roller toward a display side of the flexible display screen.

4. The flexible display screen electronic apparatus of claim 1, wherein two opposite ends of the second roller are respectively provided with one second fastening section which is configured to be able to stretch out/draw back, and stretching out/drawing back states of two second fastening sections which are configured to be able to stretch out/draw back are controlled by a same second switch.

5. The flexible display screen electronic apparatus of claim 1, wherein the first roller is further provided with a first switch configured to control a rotation of the first roller; and
   the first switch is disposed on a side of the first side frame away from the second side frame in the first direction.

6. The flexible display screen electronic apparatus of claim 1, further comprising a supporting section provided on a back of the flexible display screen.

7. The flexible display screen electronic apparatus of claim 6, wherein the supporting section comprises a supporting strip formed of a metal or a polymer material.

8. A control system for the flexible display screen electronic apparatus of claim 1, comprising:
   a first obtaining unit configured to obtain the display surface area of the flexible display screen;
   a second obtaining unit configured to obtain image data;

a processing unit configured to process the image data obtained by the second obtaining unit according to the display surface area of the flexible display screen obtained by the first obtaining unit; and a display unit configured to display an image according to a processed result of the processing unit.

9. The flexible display screen electronic apparatus of claim 1, wherein a minimum value of a length of a display region of the electronic apparatus along the first direction is equal to a distance between adjacent sides of the first side frame and the second side frame.

10. The flexible display screen electronic apparatus of claim 1, wherein the second roller is configured to be located at a side of the second side frame far away from the first side frame in a the case that the second roller is detached from the second side frame.

11. The flexible display screen electronic apparatus of claim 1, wherein a distance between the second displacement sensor and the first side frame is configured to be variable.

12. The flexible display screen electronic apparatus of claim 5, wherein the first roller is provided with a spring leaf and the first switch controls the rotation of the first roller through the spring leaf to implement spreading and winding of the flexible display screen.

13. A flexible display screen electronic apparatus, comprising:

an apparatus body, a flexible display screen, a first roller, a second roller, a first displacement sensor and a second displacement sensor, wherein the apparatus body comprises an upper frame, a lower frame opposite to the upper frame, a first side frame, and a second side frame opposite to the first side frame in a first direction;

the upper frame at least comprises a first upper frame, which acts as a length-unadjustable frame, and a second upper frame, which acts as a length-unadjustable frame and can be at least partially accommodated by the first upper frame;

the flexible display screen comprises a first end and a second end opposite to the first end;

the first roller is mounted on the first side frame, and the second roller is detachably mounted on the second side frame;

the first end is fixed on the first roller, the second end is fixed on the second roller, and the flexible display screen is configured to be windable around the first roller and the second roller, and a display surface area between the second end and the first end is configured to be variable; and the first displacement sensor is disposed on an end of the first roller, the second displacement sensor is disposed on an end of the second roller, and both the end of the first roller and the end of the second roller are closer to the lower frame compared with the upper frame.

14. The flexible display screen electronic apparatus of claim 13, wherein the lower frame at least comprises a first lower frame;

the first upper frame and the first lower frame are opposite to each other in a second direction, which is perpendicular to the first direction; and a minimum size of a display region of the electronic apparatus along the second direction is equal to a distance between adjacent sides of the first upper frame and the second upper frame.

15. The flexible display screen electronic apparatus of claim 13, wherein a size of the first upper frame along the second direction is larger than a size of the second upper frame along a second direction, which is perpendicular to the first direction.

* * * * *